April 10, 1951  K. F. MORBERG  2,548,736
TACKER
Filed Nov. 5, 1945  2 Sheets-Sheet 1
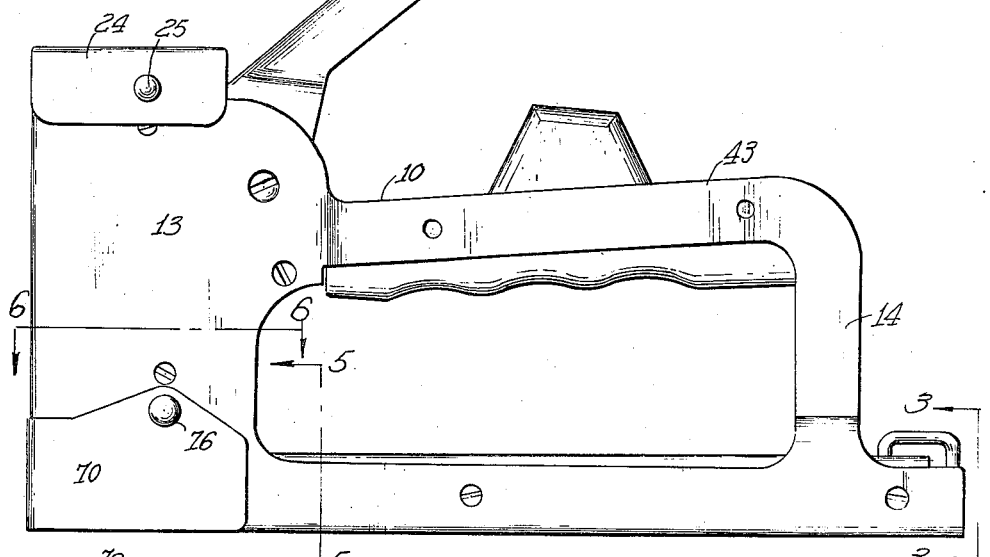
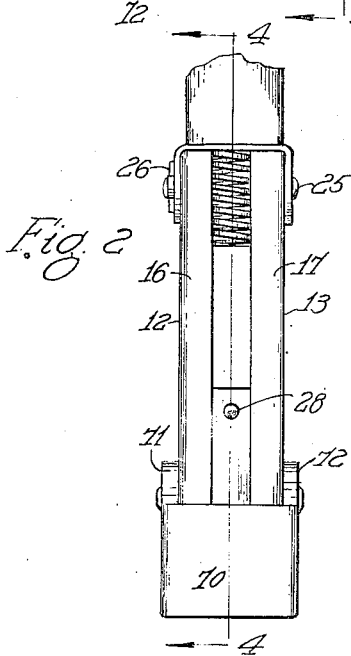
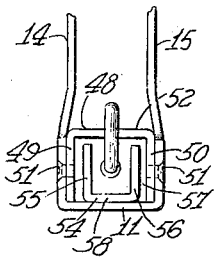
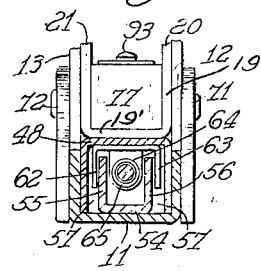
INVENTOR.
Kenneth F. Morberg
BY
Cromwell, Greist & Warden
ATTORNEYS April 10, 1951  K. F. MORBERG  2,548,736
TACKER Filed Nov. 5, 1945  2 Sheets-Sheet 2

INVENTOR.
Kenneth F. Morberg
BY
Cromwell, Greist & Warden
ATTORNEYS

Patented Apr. 10, 1951

2,548,736

UNITED STATES PATENT OFFICE 2,548,736

TACKER

Kenneth F. Morberg, Chicago, Ill., assignor to
Henry A. Torstenson, Chicago, Ill.

Application November 5, 1945, Serial No. 626,675

1 Claim. (Cl. 1—49)

My invention has to do with improvements in a hand-operated tacker or staple driving device of the type which comprises a forward chamber having a reciprocable driving plunger therein, a bottom horizontally disposed fastener feeding chamber for delivering fasteners beneath the driving plunger and a plunger actuating mechanism which is operated by a pivotal rearwardly directed handle member.

It is an object of my invention to provide in a tacker of the type described improved means for feeding the fasteners into position beneath the driving plunger.

It is a further object of my invention to provide in a tacker of the type described improved bumper means for cushioning the movement of the plunger at the end of the driving stroke.

It is also an object of my invention to provide a tacker of the type described having a removable jaw member on the lower forward portion of the driving head and improved means for removably securing the jaw member in position upon the driving head.

Other objects and advantages of my invention will be apparent from the description of the preferred form thereof, which is shown, by way of example, in the accompanying drawings, wherein:

Fig. 1 is a side elevation of the tacker;

Fig. 2 is a front end elevation of the tacker;

Fig. 3 is a rear end elevation of the tacker on the line 3—3 of Fig. 1;

Fig. 5 is a section taken on line 5—5 of Fig. 1;

Figure 4:
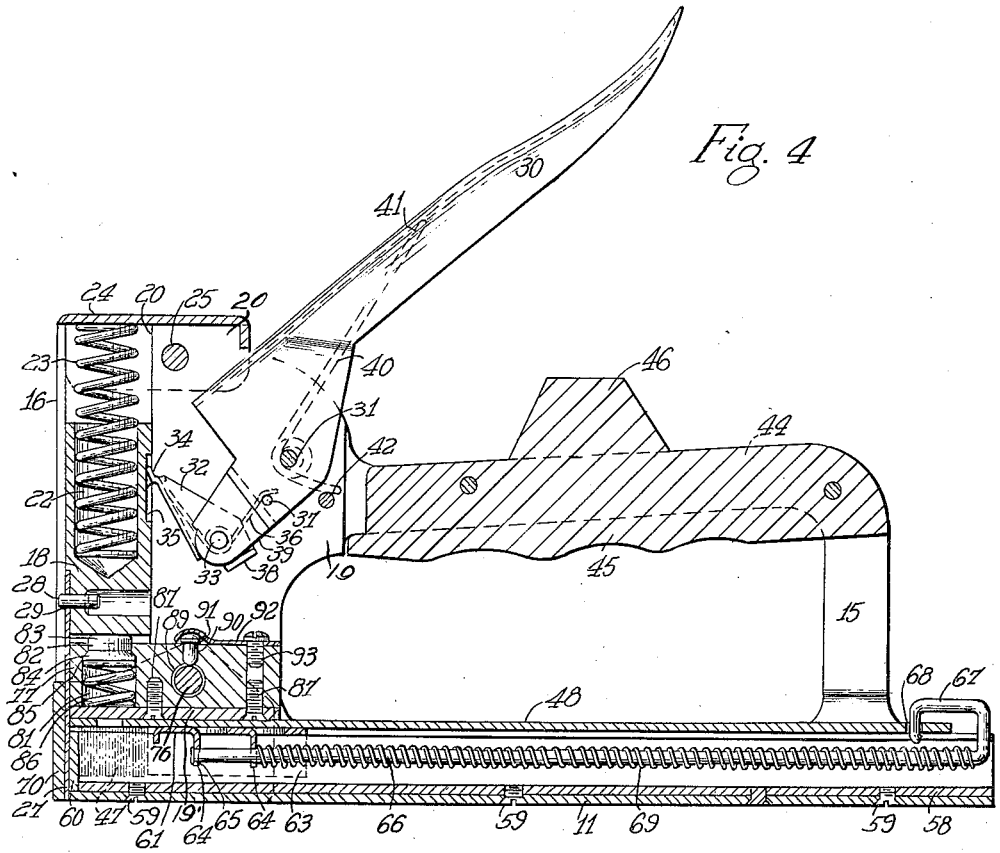
Fig. 4 is a longitudinal section taken on line 4—4 of Fig. 2.

Referring to Figs. 1, 2 and 4, my device comprises a main frame member 10 which is generally U-shaped and has a bottom 11, forward side portions 12 and 13 and rearward side members 14, 15. The forward side members 12 and 13 form a compartment or chamber in which the driving members and the operating mechanism therefor are housed. The forward edges 16 and 17 of the side members 12 and 13 are turned inwardly to form the forward side of a guide chamber which receives the driving plunger 18. A U-shaped plunger guide member 19 is arranged in the upper portion of the forward chamber with its sides 20, 21 adjacent the side members 12 and 13 so that the forward edges 20', 21' thereof form the rear of the guide chamber for the plunger 18. The plunger guide member 19 may be secured to the inner faces of the frame members 12 and 13 in any conventional manner.

The plunger 18 has a recess 22 therein which receives one end of a compression spring 23. The other end of the spring 23 abuts a top cap member 24 which is secured in position on the top of the forward chamber by means of a pin 25 which is removably secured in position by a retaining spring 26. A plunger blade 27 is removably attached to plunger 18 by means of a pin 28 secured to the plunger 18 and received in an aperture 29 in the blade 27.

The plunger 18 is reciprocated in its guide chamber by means of a hand-operated trip mechanism. As shown in Fig. 4, the trip mechanism comprises a handle 30 pivotally mounted on a pin 31 journaled in the side members 12, 13 and a trip pawl 32 pivoted on the pin 33 in the end of the handle 30. The pawl 32 comprises an end member 34 which engages in a recess 35 in the plunger 18. A spring 36 arranged on the pin 33 has one end engaged by a stop pin 37 and the other end engaged against the pawl 32 tending to hold the end 34 of the pawl in the recess 35 of the plunger 18. The pawl 32 has abutment portions 38 which engage with the lower edges 39 of the handle member 30. The arrangement is such that when the handle member 30 is moved downwardly from the position shown in Fig. 4 and pivoted about the pin 31 it will carry the pawl 32 upwardly as the latter is urged forwardly by the spring 36. The pawl 32 has a limited movement in the forward direction due to the engagement of the abutments 38 with the edges 39 of the handle member. The relationship of the pivot pin 31 with respect to the other members is such that, as the handle continues to move downwardly, the pawl 32 carries the plunger 18 upwardly to a predetermined point whereupon continued movement of the handle moves the end 34 of the pawl 32 out of engagement with the recess 35 in the plunger 18 and allows the spring 23 to drive the plunger 18 downwardly. A spring 40 is arranged on the pin 31 with one end 41 engaged against the inner side of the handle 30 and the other end engaged by a stop member 42 secured between the frame members 12 and 13. The spring 40 tends to turn the handle in a counterclockwise direction, thus positioning the trip pawl 32 with its end 34 in engagement in the recess 35 of the plunger 18, with the plunger at the lower limit of its movement.

The rearward side members 14 and 15 of the frame 10 include horizontal portions 43, 44 between which a handle grip member 45 is arranged. The handle grip 45 includes an upwardly projecting member 46 which limits the downward movement of the movable handle 30.

Figure 7:
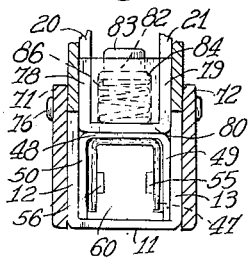
Fig. 7 is a section taken on line 7—7 of Fig. 6.

Horizontally arranged on the bottom 11 of the frame 10 is a magazine or bottom chamber having mechanism for receiving a supply of staples 47 and delivering them into position for driving beneath the blade 27. This magazine comprises an outer channel member 48 arranged with its legs 49 and 50 downwardly directed and secured by set screws 51 or the like to the inner sides of the bottom portion of the frame side members 14, 15. The bottom 52 of the channel 48 forms a top cover for the fastener magazine. An inner channel member 54 is arranged with its legs 55, 56 upwardly directed but spaced from the channel 48 to provide a guideway 57 for receiving the fastener members 47. The bottom 58 of the channel 54 is secured to the base 11 of the frame by means of the set screws 59. At the forward end of the magazine a stop plate or channel block 60, Figs. 4 and 7, is provided which is secured to the channel members and provided for the extension of the guideway 57 in which the fasteners move into driving position beneath the driving blade 27.

The fasteners 47 are urged forwardly in the magazine by a pusher member 61. As shown in Figs. 4 and 5 the pusher member 61 has downwardly extending legs 62, 63 which are received in the guideway 57 between the channel members 48 and 54. The forward edge of the pusher member 61 engages the rearmost staple 47 in the guideway. The pusher member 61 has centrally disposed downwardly directed lugs 64 having aligned apertures 65 therein which receive the forward end of a pusher rod 66, the end of the rod being enlarged so that the pusher member 61 is permanently but slidably secured on the rod. At the rearward end, the rod 66 is turned upwardly and back upon itself to form a rearwardly directed hook 67. An aperture 68 is provided in the outer channel member 48 adjacent the rear thereof to receive the hook 67 on the pusher rod 66. A compression spring 69 is arranged on the rod 66 extending from the rear end thereof to the rearward one of the lugs 64 on the pusher member 61. The spring 69 operates to urge the pusher member 61 forwardly and into engagement with the staples 47 and at the same time urges the pusher rod 66 rearwardly to hold the hook member 67 in engagement in the aperture 68.

At the lower forward end of the driving head there is provided a front jaw member 70. The inturned members 16, 17 are cut away at their lower ends to receive the front portion of the jaw member 70 as shown in Fig. 2. The jaw member 70 is arranged to be removably positioned on the frame, having rearwardly extending side members 71 and 72 which embrace the lower portion of the frame. On the inner side of the front wall of the jaw 70 a guide recess 73 is provided to receive the plunger blade 27. The recess 73 functions as a guide means for the blade 27 and also as positioning or guide means for receiving the staples 47 in proper position for driving when the blade 27 has been raised preparatory to a driving operation. The rearwardly extending side members 71 and 72 are apertured at 74 and 75 to receive a removable retaining pin 76.

Figure 6:
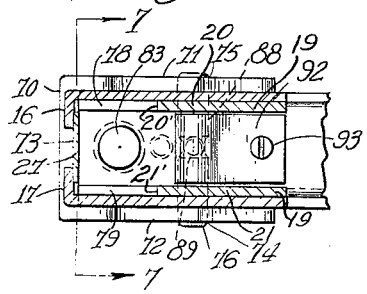
Fig. 6 is a section taken on line 6—6 of Fig. 1.

Arranged beneath the lowermost position of the plunger 18 and above the forward end of the staple magazine is a bumper block 77. As seen in Figs. 5, 6 and 7, the bumper block 77 is received between the walls 20 and 21 of the guide plate 19 and rests on the bottom 19' of the same. The side walls 20 and 21 and the bottom 19' of the guide plate 19 have forward extensions 78, 79 and 80. The bumper block 77 has a recess 81 in the forward end thereof and arranged thereon is a bumper 82 having a portion 83 extending upwardly from the top surface of the bumper block. An enlarged portion 84 on the bumper 82 is received in an enlarged portion 85 of the recess 83 to retain the bumper therein and a compression spring 86 urges the bumper upwardly. The bumper block may be secured to the bottom 19' of guide plate 19 by set screws 87. A bore 88 is provided in the bumper block to receive the removable pin 76 which is provided to retain the jaw member 70 in position. The pin 76 is provided with a groove 89. Arranged in the bumper block 77 is a vertical recess 90 in which there is received a pin 91 which is held in position in the recess by a spring 92 secured on the top of the bumper block 77 by a set screw 93. The end of the pin 91 is urged by the spring 92 into engagement in the groove 89 in the removable pin 76 to releasably retain the pin 76 whereby it may be readily removed to free the rearwardly extending members 71, 72 and permit the removal of the front jaw member 70. This gives access to the forward portion of the fastener magazine to remove a damaged fastener or the like.

To use my tacker the forward bottom portion is positioned against the member in which it is desired to drive a staple. The user grips the handle members 30 and 45 between the fingers and the palm of his hand to move the handle 30 toward the grip member 45. The pawl 32 is moved upwardly and raises the plunger 18 against the force of the spring 23. When the end 34 of pawl 32 is pulled from the recess 35 in the plunger 18 the plunger 18 is released to deliver the driving blow against the staple 47 which has been moved forward in the magazine to driving position beneath driving blade 27 by the pusher plate 61 which is urged forwardly by spring 69. The bumper cushions the blow of the plunger 18.

I have referred to specific details of construction in describing my device, but it is contemplated that other constructions may be resorted to within the spirit of my invention.

I claim:

In a fastener driving mechanism comprising a housing having an upright guideway, a driver mounted in said guideway, spring means for forcing the driver downwardly to drive a fastener, means for feeding fasteners to a driving position beneath the driver, means for raising the driver against the action of the spring to a predetermined position and then releasing the same, a bumper block having a forward portion extending beneath the driver and provided with a recess therein, a spring pressed bumper member mounted in said recess whereby upon descent of the driver to deliver a blow to drive a staple the driver will engage the bumper near the end of its movement to cushion the same.

KENNETH F. MORBERG.

(References on following page)

REFERENCES CITED

The following references are of record in the file of this patent:

UNITED STATES PATENTS

| Number | Name | Date |
|---|---|---|
| 1,541,625 | Chapman | June 9, 1925 |
| 1,757,812 | Polzer | May 6, 1930 |
| 1,905,241 | Polzer | Apr. 25, 1933 |
| 2,154,755 | Krantz | Apr. 18, 1939 |
| 2,161,449 | Blumenbaum | June 6, 1939 |
| 2,265,361 | Drypolcher | Dec. 9, 1941 |
| 2,268,102 | Attula | Dec. 30, 1941 |
| 2,300,277 | Hansen | Oct. 27, 1942 |
| 2,309,628 | Crosby | Feb. 2, 1943 |
| 2,310,529 | Krantz | Feb. 9, 1943 |
| 2,311,412 | Pankonin | Feb. 16, 1943 |
| 2,314,847 | Polzer | Mar. 23, 1943 |
| 2,314,848 | Polzer | Mar. 23, 1943 |
| 2,337,479 | Lindstrom | Dec. 31, 1943 |